United States Patent
Herdendorf et al.

(10) Patent No.: US 7,805,830 B2
(45) Date of Patent: Oct. 5, 2010

(54) HEAD GIMBAL ASSEMBLY LOADING WITH FIXED MOUNTING SURFACE

(75) Inventors: Brett Robert Herdendorf, Mound, MN (US); Ronald Eldon Anderson, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/517,701

(22) Filed: Sep. 8, 2006

(65) Prior Publication Data

US 2008/0060186 A1 Mar. 13, 2008

(51) Int. Cl.
G11C 5/12 (2006.01)
G11B 5/127 (2006.01)
H04R 31/00 (2006.01)

(52) U.S. Cl. ..................... 29/737; 29/603.03
(58) Field of Classification Search ............. 29/603.04, 29/603.09, 603.03, 603.06, 729, 737; 360/244.5, 360/245.2, 265.9, 244.6, 244.7
See application file for complete search history.

(56) References Cited

U.S. PATENT DOCUMENTS

| | | |
|---|---|---|
| 2,971,179 A | 2/1961 | Heuer |
| 3,414,253 A | 12/1968 | Mewse |
| 4,468,074 A | 8/1984 | Gordon |
| 4,520,555 A | 6/1985 | Gyi et al. |
| 4,645,280 A | 2/1987 | Gordon et al. |
| 4,766,371 A | 8/1988 | Moriya |
| 5,198,945 A | 3/1993 | Blaeser et al. |
| 5,297,413 A | 3/1994 | Schones et al. |
| 5,496,182 A | 3/1996 | Yasumura |
| 5,675,082 A | 10/1997 | Marr et al. |
| 5,682,780 A | 11/1997 | Girard |
| 5,706,080 A | 1/1998 | Pekin et al. |
| 5,786,677 A * | 7/1998 | Marr .......................... 318/560 |
| 5,844,420 A | 12/1998 | Weber et al. |
| 5,896,735 A * | 4/1999 | Wirtz .......................... 57/312 |
| 6,034,851 A | 3/2000 | Zarouri et al. |
| 6,125,003 A | 9/2000 | Tsuda et al. |

(Continued)

OTHER PUBLICATIONS

Genetec Technology Berhard, "Auto Shunt Machine—Automatic HGA Shunting System," http://genetec.net/machine/Shunting.htm, printed Jan. 7, 2005.

(Continued)

Primary Examiner—A. Dexter Tugbang
Assistant Examiner—David P Angwin
(74) Attorney, Agent, or Firm—Shumaker & Sieffert, P.A.

(57) ABSTRACT

A device comprises a mounting surface configured to mount a head gimbal assembly (HGA), a housing that pivots relative to the mounting surface, and a mechanism coupled to the housing that deflects the HGA when the housing pivots relative to the mounting surface. For example the mechanism may be a pneumatically actuated finger that pulls the HGA towards the housing. The device may be used to load the HGA on a rotating test disc. Once loaded on the test disc, the HGA is supported only by the mounting surface and an air bearing at an interface of a slider of the HGA and the test disc. Embodiments of the invention may provide precise and repeatable positioning of the HGA because dimensional tolerances and vibrations in the mechanism are not transferred to the HGA once it is loaded on the test disc.

20 Claims, 6 Drawing Sheets

U.S. PATENT DOCUMENTS

| | | | |
|---|---|---|---|
| 6,132,554 A * | 10/2000 | Traise et al. | 156/442.1 |
| 6,140,661 A | 10/2000 | Nodelman | |
| 6,163,950 A | 12/2000 | Bodiker, II et al. | |
| 6,255,750 B1 | 7/2001 | Mohajerani et al. | |
| 6,307,467 B1 | 10/2001 | Starkey et al. | |
| 6,378,195 B1 | 4/2002 | Carlson | |
| 6,459,260 B1 | 10/2002 | Bonin et al. | |
| 6,483,670 B1 | 11/2002 | Watanabe | |
| 6,487,028 B1 | 11/2002 | Sri-Jayantha et al. | |
| 6,512,367 B2 | 1/2003 | Liu et al. | |
| 6,566,870 B2 | 5/2003 | Sorenson et al. | |
| 6,580,572 B1 | 6/2003 | Yao et al. | |
| 6,704,165 B2 | 3/2004 | Kube et al. | |
| 6,717,776 B2 | 4/2004 | Boutaghou | |
| 6,789,659 B2 * | 9/2004 | Spejna et al. | 198/346.1 |
| 6,801,387 B1 | 10/2004 | Rahman | |
| 7,048,266 B2 | 5/2006 | Starr | |
| 7,084,654 B2 | 8/2006 | Zhao et al. | |
| 7,094,718 B2 | 8/2006 | Kwon et al. | |
| 7,127,799 B2 | 10/2006 | Girard et al. | |
| 7,159,299 B1 | 1/2007 | McMunigal et al. | |
| 7,345,840 B2 | 3/2008 | Gomez et al. | |
| 7,379,265 B2 | 5/2008 | Wang et al. | |
| 2001/0054225 A1 * | 12/2001 | Mita et al. | 29/603.02 |
| 2002/0039253 A1 | 4/2002 | Imai et al. | |
| 2002/0053590 A1 | 5/2002 | Lennard et al. | |
| 2002/0069510 A1 | 6/2002 | Girard et al. | |
| 2002/0075602 A1 | 6/2002 | Mangold et al. | |
| 2003/0107839 A1 | 6/2003 | Smith | |
| 2003/0179493 A1 | 9/2003 | Kim | |
| 2003/0182788 A1 | 10/2003 | Fayeulle et al. | |
| 2004/0213138 A1 | 10/2004 | Kim | |
| 2004/0252405 A1 | 12/2004 | Sun et al. | |
| 2005/0028353 A1 * | 2/2005 | Kidachi et al. | 29/603.03 |
| 2005/0036235 A1 | 2/2005 | Ng | |
| 2005/0047000 A1 | 3/2005 | Albrecht et al. | |
| 2005/0057860 A1 | 3/2005 | Lau et al. | |
| 2005/0157430 A1 | 7/2005 | Korkowski et al. | |
| 2005/0209797 A1 | 9/2005 | Anderson et al. | |
| 2006/0006895 A1 * | 1/2006 | Zhao et al. | 324/757 |
| 2006/0116011 A1 * | 6/2006 | Sinclair | 439/110 |
| 2006/0119977 A1 | 6/2006 | Zhu et al. | |
| 2007/0046311 A1 * | 3/2007 | Schaeffer et al. | 324/765 |
| 2007/0115593 A1 | 5/2007 | Yao | |
| 2007/0136022 A1 | 6/2007 | Anderson et al. | |

OTHER PUBLICATIONS

Joseph Ogando, "Intelligent Fasteners," Design News, Oct. 20, 2003, pp. 1-5, www.designnews.com/index.asp?layout=article&articleid=CA328003&sst=001&pubdate, printed Oct. 23, 2006.

Anderson et al, "Method and Apparatus for Head Gimbal Assembly Testing," U.S. Appl. No. 11/056,337, filed Feb. 11, 2005.

* cited by examiner

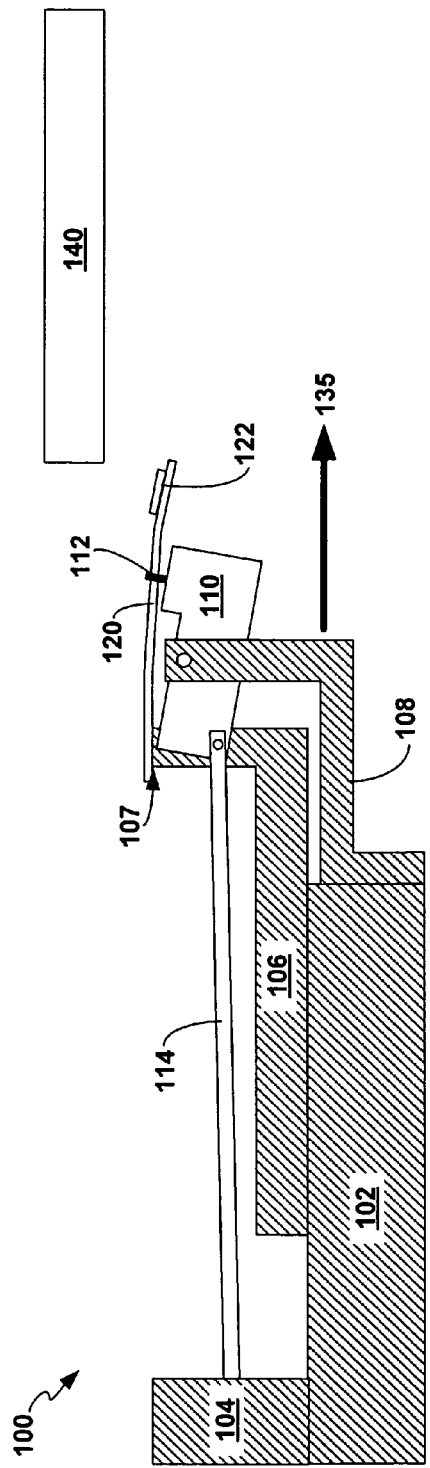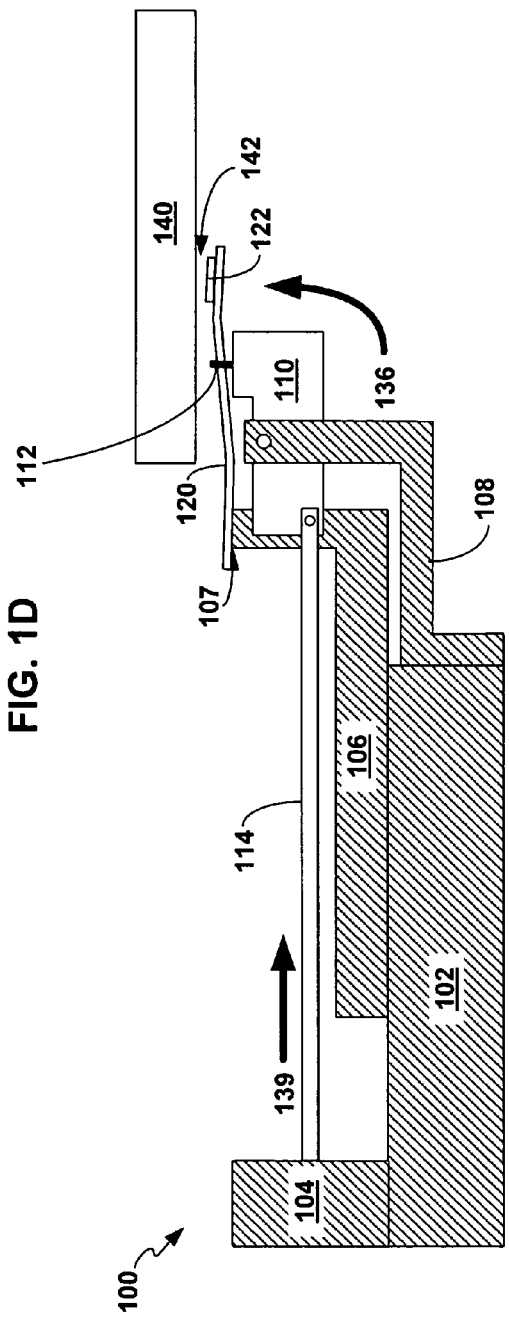

US 7,805,830 B2

HEAD GIMBAL ASSEMBLY LOADING WITH FIXED MOUNTING SURFACE

TECHNICAL FIELD

The invention relates to testing head gimbal assemblies for disc drives.

BACKGROUND

In the disc drive industry, head gimbal assemblies (HGAs) may be individually tested prior to installation in a disc drive. Testing an HGA may include positioning the HGA adjacent to a rotating test disc and reading to and/or writing from the test disc with the HGA. Accurate positioning of the HGA adjacent to the test disc is required to reliably determine its suitability for inclusion in a disc drive. For example, performances of an HGA during read and write operations may be dependent on the location and skew of the HGA relative to the test disc. Furthermore, contact between the HGA and the test disc is undesirable because it may damage the test disc and/or the HGA.

SUMMARY

In general, the invention is directed to techniques providing repeatable and reliable positioning of HGAs. Embodiments of the invention allow mounting a head gimbal assembly (HGA) on a fixed mounting surface, mechanically deflecting the HGA to reduce its height above the mounting surface, moving the mounting surface to locate the HGA adjacent to a rotating test disc and releasing the HGA under control to allow the HGA to form an air bearing with the test disc without impacting the test disc. Once released, the HGA is supported only by the fixed baseplate and the air bearing. Importantly, mechanisms used to deflect the HGA do not also support the HGA during its testing. In this manner, embodiments of the invention eliminate possible sources of variation in positioning HGAs during testing. This may increase the precision and reliability of testing of HGAs.

In one embodiment, the invention is directed to a device comprising a mounting surface configured to mount a head gimbal assembly, a housing that pivots relative to the mounting surface, and a mechanism coupled to the housing that deflects the head gimbal assembly when the housing pivots relative to the mounting surface.

In another embodiment, the invention is directed to an assembly comprising a head gimbal assembly, a rotatable disc, and a head gimbal assembly loader. The head gimbal assembly loader includes a mounting surface configured to mount the head gimbal assembly, a housing that pivots relative to the mounting surface, and a mechanism coupled to the housing that deflects the head gimbal assembly when the housing pivots relative to the mounting surface.

In another embodiment, the invention is directed to a method comprising mounting a head gimbal assembly on a mounting surface, deflecting the head gimbal assembly by actuating a retractable finger mounted to a housing towards the housing, pivoting the housing relative to the mounting surface to further deflect the head gimbal assembly, positioning the head gimbal assembly adjacent to a disc, and loading the head gimbal assembly on the disc.

The details of one or more embodiments of the invention are set forth in the accompanying drawings and the description below. In addition to the details described in this summary or the invention, other features, objects, and advantages of the invention will be apparent from the following description and drawings, and from the claims.

BRIEF DESCRIPTION OF DRAWINGS

FIGS. 1A-1E are conceptual illustrations of the operation of a head gimbal assembly (HGA) loader.

DETAILED DESCRIPTION

Figure 1A:
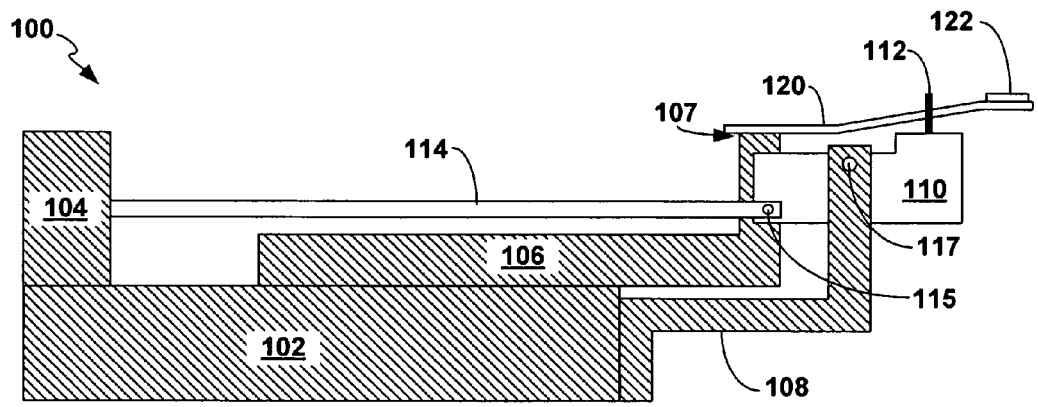
Figure 1B:
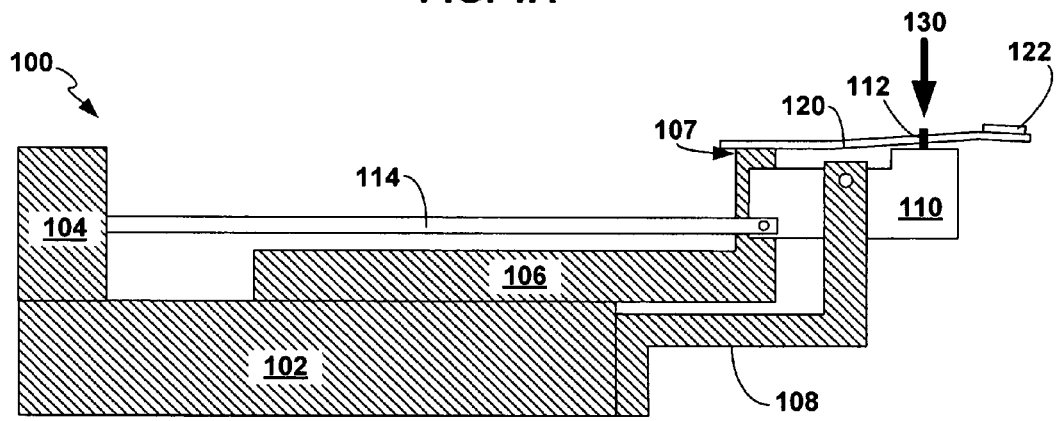
Figure 1C:
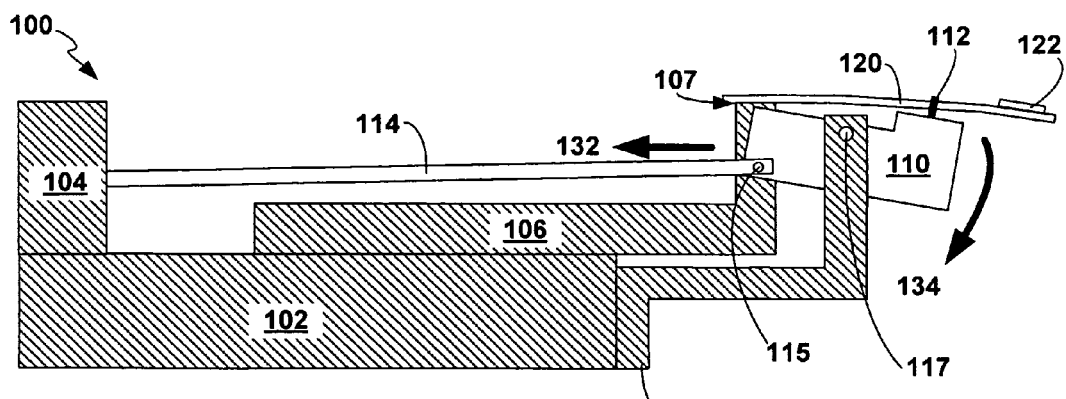

FIGS. 1A-1E are conceptual illustrations of the operation of head gimbal assembly (HGA) loader 100 as it loads HGA 120 on test disc 140. Components of HGA loader 100 are mounted on baseplate 102. Actuator 104, HGA platform 106 and pivot bracket 108 are all fixedly coupled to baseplate 102. These components of HGA loader 100 are fixed relative to each other; their fixed positions are represented by the shading lines in FIGS. 1A-1E. Housing 110 pivots relative to baseplate 102 and is mounted to baseplate 102 via snap-lock interface 117 at pivot bracket 108. Actuator 104 is operable to pivot housing 110 by moving linkage 114. Housing 110 holds the mechanism for retractable finger 112, which is operable to deflect HGA 120 as shown in FIG. 1B.

Before HGA 120 can be loaded on test disc 140, it must first be mounted to HGA loader 100. As illustrated in FIG. 1A, HGA 120 is mounted on mounting surface 107 of HGA platform 106. HGA 120 may be positioned on mounting surface 107 using pick and place techniques. Because HGA platform 106 is fixedly coupled to baseplate 102, the location of baseplate 102 provides a direct reference point for the location of HGA 120 when mounted to mounting surface 107.

To locate HGA 120 precisely on mounting surface 107 of HGA platform 106, HGA 120 may include a boss hole and one or more a tooling hole, which line up with a boss hole pin and alignment pins on mounting surface 107. Techniques for precisely mounting an HGA are described in U.S. Pat. No. 7,529,635 to Anderson et al., the entire content of which is incorporated herein by reference. Techniques to precisely locate HGA 120 on HGA platform 106 other than those described in U.S. Pat. No. 7,529,635 to Anderson et al. are also possible.

When in a raised position relative to HGA platform 106, e.g., as shown in FIG. 1A, retractable finger 112 allows HGA 120 to be moved on to or off of HGA platform 106. As shown in FIG. 1B, once HGA 120 is mounted on HGA platform 106, retractable finger 112 pulls HGA 120 towards housing 110 to deflect HGA 120 such that the distance from head 122 to a plane defined by a surface of disc 140 is slightly less than the target distance, which is the distance from head 122 to the plane of disc 140 when HGA 120 is supported by air bearing 142 (FIG. 1E). The target distance is also known as the z-height. Retractable finger 112 may be actuated using a hydraulic or pneumatic piston, by other mechanical means, or by any combination thereof. As another example, retractable finger 112 may be actuated pneumatically, but biased in one direction with a spring.

As previously mentioned, housing 110 is mounted to baseplate 102 with pivot bracket 108. Housing 110 attaches to pivot bracket 108 via snap-lock interface 117. Snap-lock interface 117 allows housing 110 to be easily removed, e.g., for replacement or service. Similarly, linkage 114 connects to housing 110 with snap-lock interface 115. As shown in FIG.

1C, after finger 112 is retracted, actuator 104 pulls linkage 114 in direction 132 to pivot housing 110 in direction 134 to further deflect HGA 120 below the plane of disc 140 to enable moving the HGA adjacent to disc 140 without crashing head 122 into disc 140. Housing 110 pivots relative to mounting surface 107; however, the relative angle of mounting surface 107 compared to the disc 140 does not change. For example, mounting surface 107 may remain parallel to disc 140 as housing 110 pivots relative to mounting surface 107. Actuator 104 may be any variety of actuator, such as a pneumatic actuator or a mechanical actuator with a servo controlled motor. However, using a servo controlled motor actuator may allow for accurate velocity control for tilting housing 110.

FIG. 1D illustrates locating HGA loader 100 such that HGA 120 is adjacent to test disc 140. The exact position of HGA 120 relative to test disc 140 can be determined from the position of baseplate 102. For example, baseplate 102 may be moved in direction 135 using one or more servo controlled motors. Other techniques for moving baseplate 102 may also be used. In other embodiments, test disc 140, rather than HGA loader 100, may be moved to locate HGA 120 adjacent to test disc 140.

As shown in FIG. 1E, once positioned adjacent to test disc 140, HGA 120 is loaded on test disc 140. Loading HGA 120 on test disc 140 is accomplished by tilting housing 110 upwards in direction 136 using actuator 104 to push linkage 114 in direction 139. Test disc 140 rotates, which creates pressure at the interface between head/slider 122 and test disc 140 to form air bearing 142. Eventually, this pressure creates a force on head/slider 122 to form air bearing 142 between head 122 and test disc 140. Housing 110 continues to pivot past the point that the force of air bearing 142 overcomes the gimbal force of HGA 120 to such that finger 112 no longer touches HGA 120. Once finger 112 no longer touches HGA 120 and HGA 120 reaches a substantially stable Z-height relative to test disc 140, HGA 120 is considered to be loaded on test disc 140. Once loaded on test disc 140, HGA 120 is supported only by HGA platform 106 and air bearing 142. In this manner, vibrations, tolerances and other dimensional variations in the moveable components of HGA loader 100, including actuator 104, linkage 114, housing 110, snap-lock interface 115, snap-lock interface 117 and finger 112, do not affect the position of HGA 120 once it is loaded on test disc 140.

The position of HGA 120 directly correlates to the position of baseplate 102. HGA 120 does not touch housing 110 during testing of HGA 120, and the precise position of HGA 120 can be determined from the position of baseplate 102. Because baseplate 102 provides a large and stable platform for HGA loader 100, its position is relatively easy to control and measure. By controlling and measuring the position of baseplate 102, the position of HGA 120 and other HGAs for testing can also be controlled and measured. For example, the Z-height distance of baseplate 102 relative to test disc 140 can be accurately controlled and measured to provide a precise and repeatable Z-height for testing of HGA 120 and other HGAs.

Furthermore, HGA loader 100 may provide other advantages. For example, HGA loader 100 allows HGA 120 to be loaded on test disc 140 at any location. This may reduce costs associated with testing compared to testing equipment that only provides loading at a single radius. For example, a test disc may be locally damaged if an HGA crashes on its surface. HGA loader 100 would allow further testing of HGAs by locating the HGAs at a different radius on the test disc than that of the damaged portions.

Figure 2:
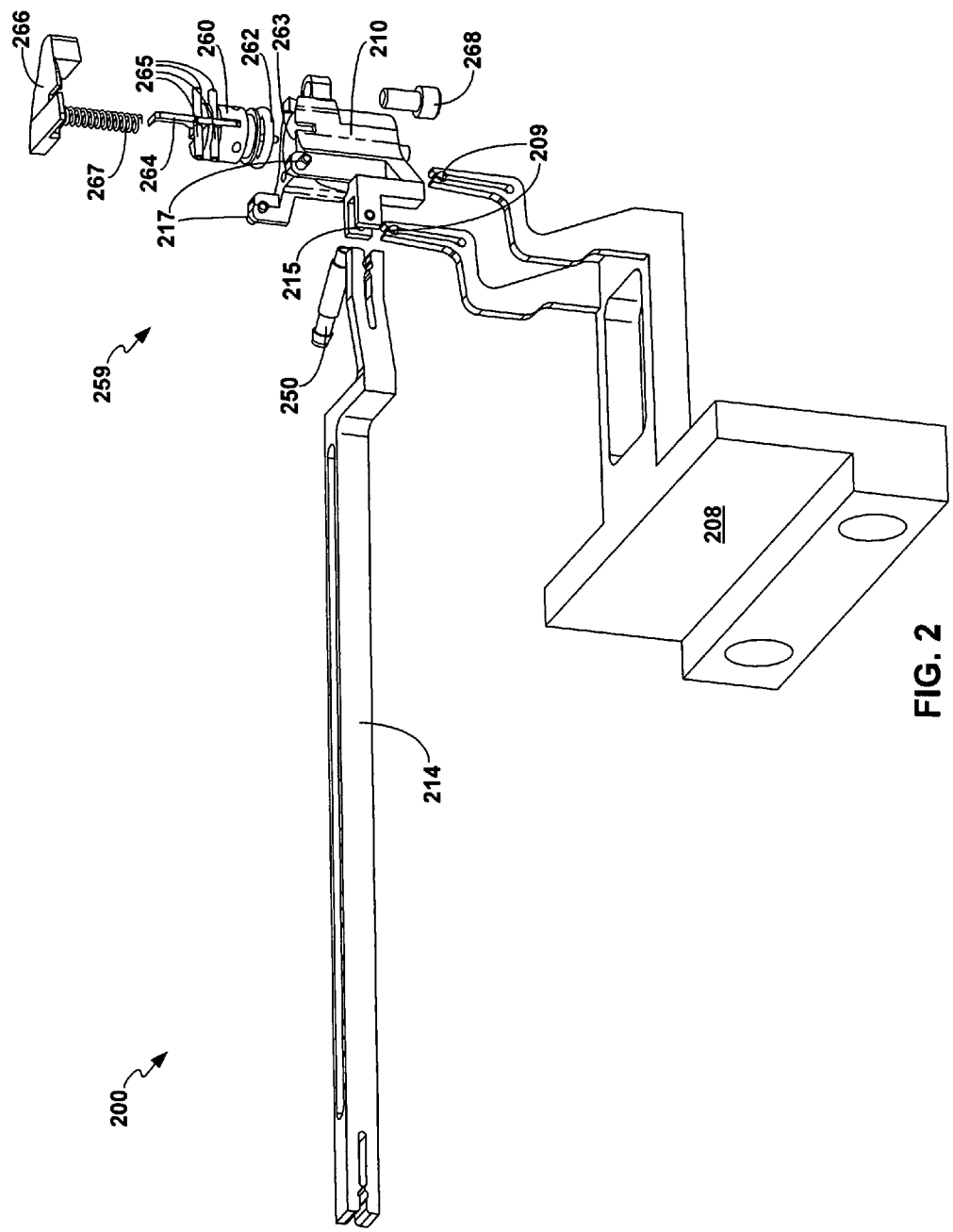
FIG. 2 is an exploded view of an HGA load mechanism for an HGA loader.
Figure 3:
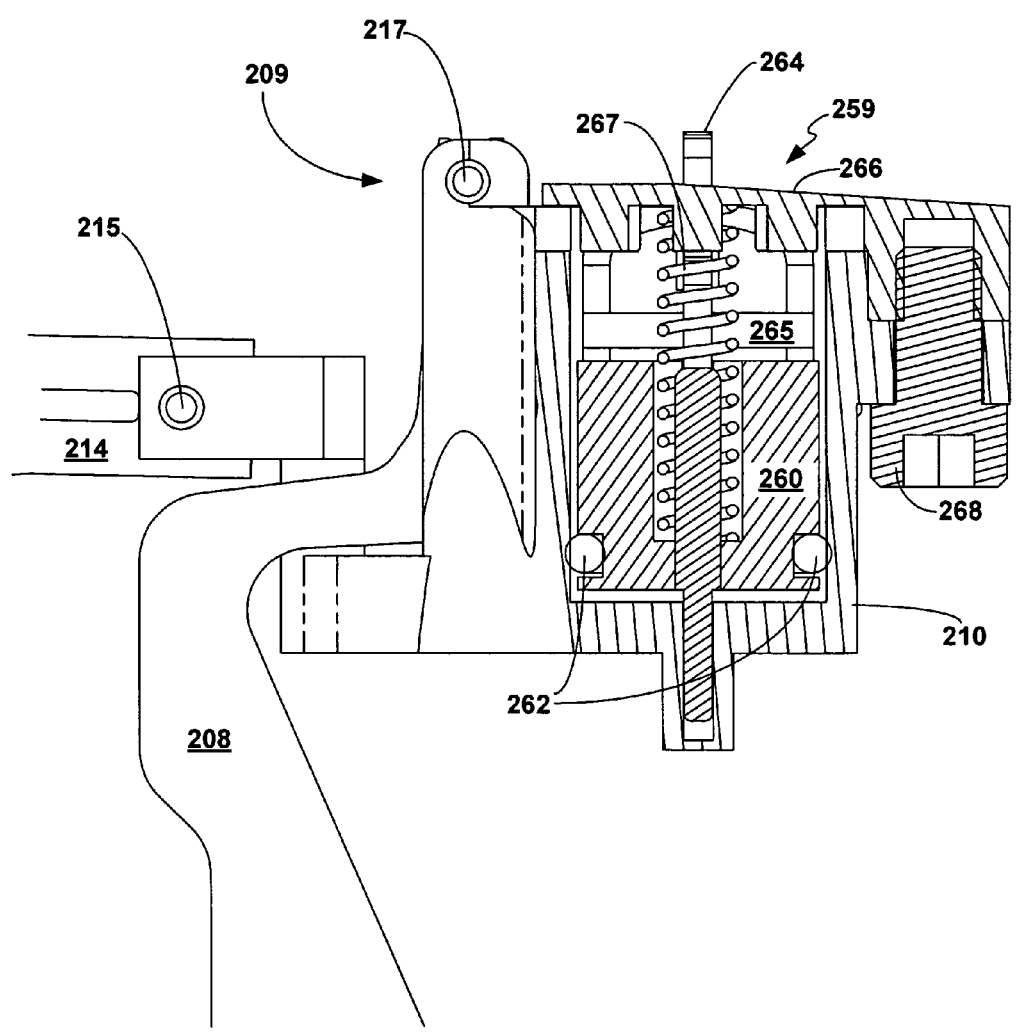
FIG. 3 is a close-up view of a portion of the HGA load mechanism shown in FIG. 2 including a pivoting housing, a retractable finger and a piston assembly.

FIG. 2 illustrates a line drawing of HGA load mechanism 200 for an HGA loader. FIG. 3 illustrates piston assembly 259, which is part of HGA load mechanism 200. Piston assembly 259 includes pivoting housing 210, piston 260 and retractable finger 264. HGA load mechanism 200 operates in a substantially similar manner as the load mechanism of HGA loader 100. For brevity, some features of HGA load mechanism 200 that are the same or similar to features discussed with respect to HGA loader 100 are discussed in limited detail, or in some cases not at all, with respect to HGA load mechanism 200.

HGA load mechanism 200 includes a linkage 214, which connects to HGA load mechanism 200 at pin 215. HGA load mechanism 200 is operable to pivot housing about pins 217. Linkage 214 also connects to an actuator (not shown). Pivot bracket 208 includes notches 209, which combine with pins 217 to form a snap-lock interface to hold housing 210. Pivot bracket 208 is secured to a baseplate (not shown) and is fixed relative to a mounting surface (not shown) for an HGA.

HGA load mechanism 200 includes retractable finger 264, which is operable to deflect a head gimbal assembly towards housing 210. Retractable finger 264 is actuated by piston 260, which fits into cylinder 263 on housing 210. O-ring 262 fits on piston 260 to form a seal with cylinder 263. Piston 260 is biased downward by spring 267, which also pushes upwards on cover 266. Cover 266 is held to housing 210 with screw 268. Piston 260 is pneumatically operated via air inlet 250. Finger 264 moves in conjunction with piston 260. Pins 265 of finger 264 follow grooves in housing 210 to rotate finger 264 away from the top surface of cover 266 when finger 264 is fully extended. This allows positioning of an HGA above cover 266 without interference from finger 264.

Figure 4:
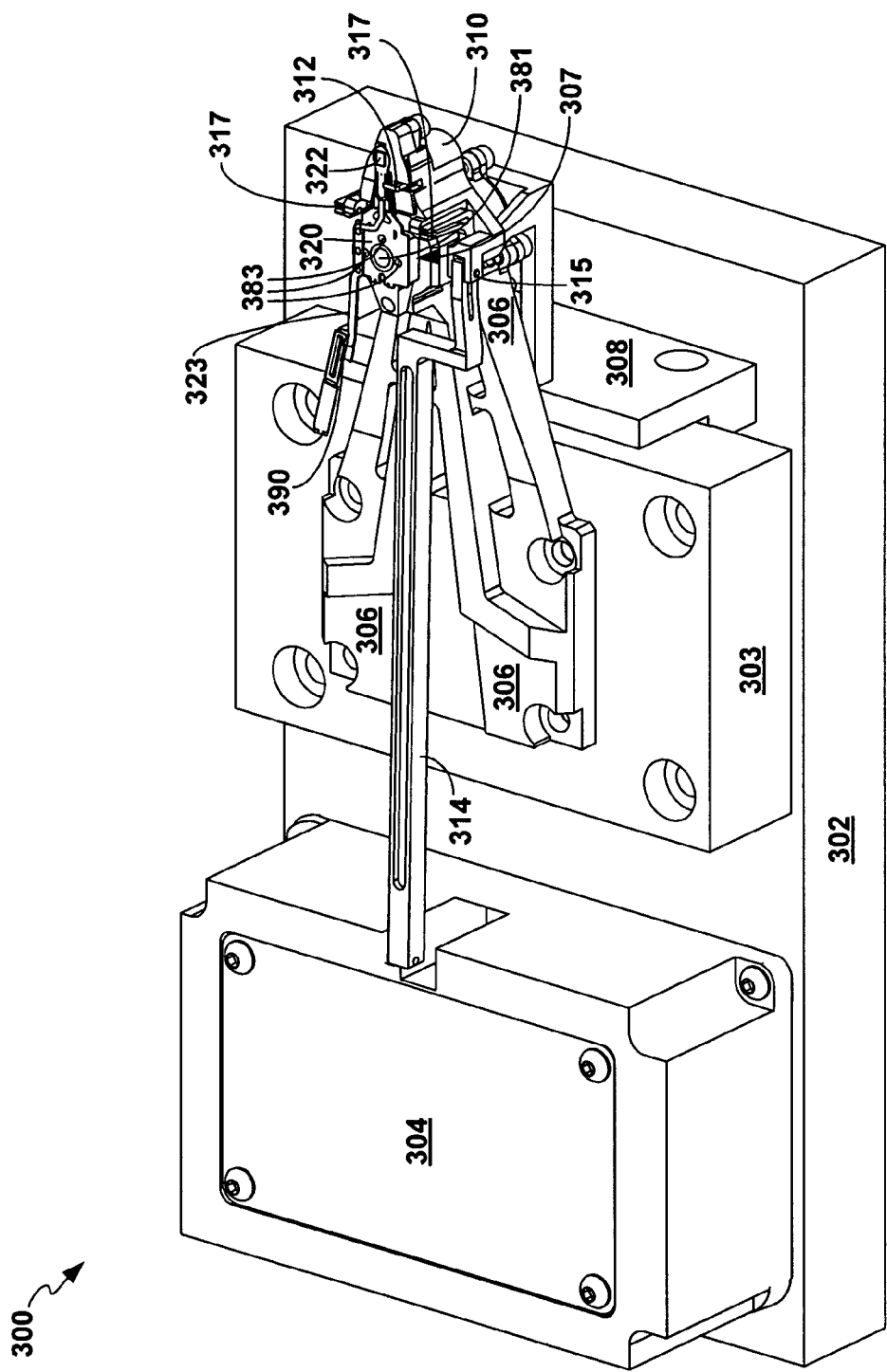
FIG. 4 illustrates an HGA mounted on an HGA loader.
Figure 5:
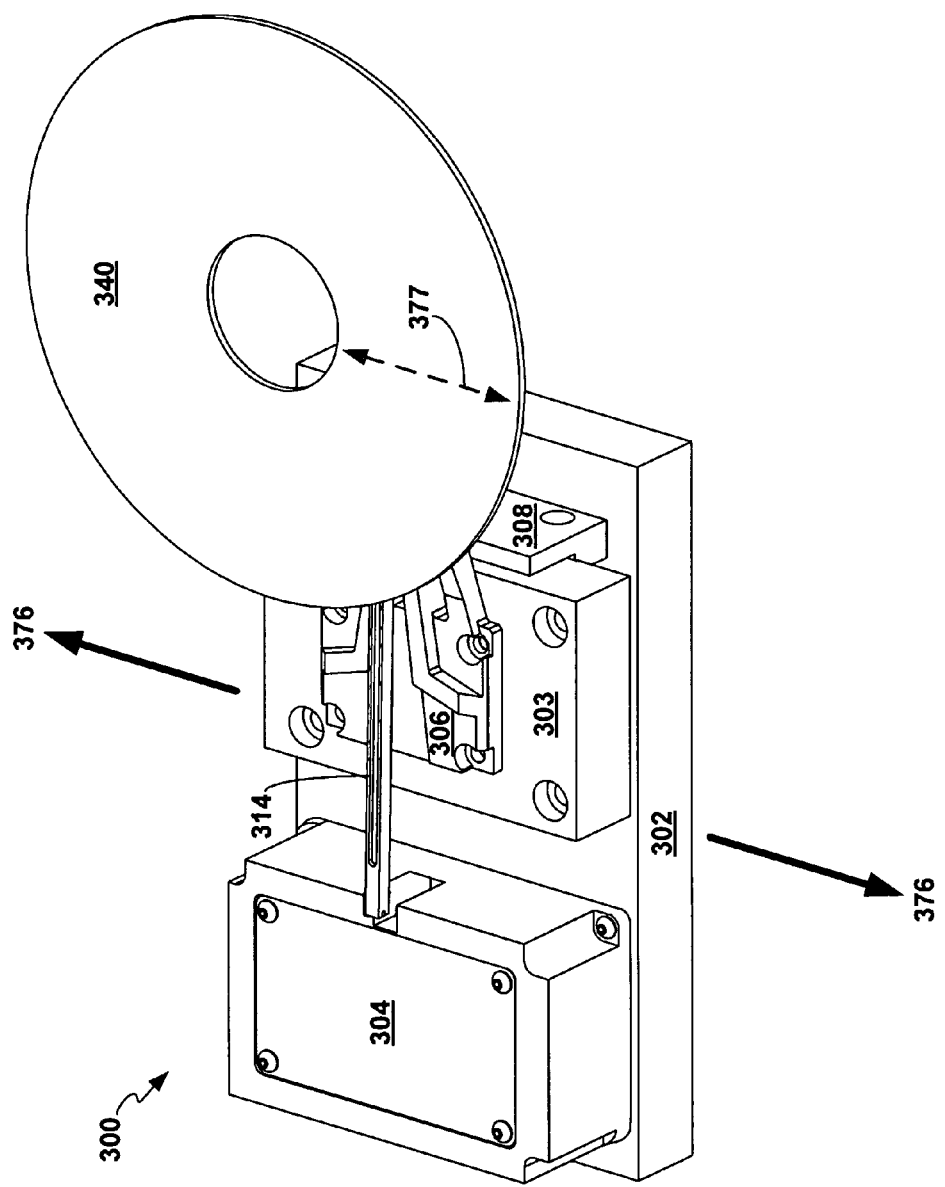
FIG. 5 illustrates the HGA mounted on the HGA loader of FIG. 4, wherein the HGA is loaded on a test disc.

FIG. 4 illustrates HGA 320 mounted on HGA loader 300. FIG. 5 illustrates the HGA 320 mounted on an HGA loader 300 and loaded on test disc 340. HGA loader 300 operates in a substantially similar manner as HGA loader 100 and HGA load mechanism 200. For brevity, some features of HGA loader 300 that are the same or similar to features discussed with respect to HGA loader 100 and HGA load mechanism 200 are discussed in limited detail, or in some cases not at all, with respect to HGA loader 300.

HGA loader 300 is operable to load HGA 320 on test disc 340. Actuator 304, HGA platform 306 and pivot bracket 308 are all fixedly coupled to baseplate 302. Housing 310 is mounted to baseplate 302 via snap-lock interface 317 at pivot bracket 308. Actuator 304 is operable to pivot housing 310 by moving linkage 314. Housing 310 holds the mechanism for retractable finger 312, which is operable to pull HGA 320 towards housing 310. Retractable finger 312 may be actuated using a hydraulic or pneumatic piston, or by other mechanical means.

HGA 320 is precisely located on mounting surface 307 of HGA platform 306. HGA 320 may include boss hole 381 and a tooling holes 383, which line up with a boss hole pin and alignment pins on HGA platform 306.

Actuator 304 pulls linkage 314 to pivot housing 310 to deflect HGA 320 below the plane of the disc to enable moving HGA 320 adjacent to disc 340 without crashing head 322 into disc 340. Then HGA 320 is moved adjacent to test disc 340, where it can be loaded on test disc 340.

Loading HGA 320 on test disc 340 is accomplished by tilting housing 310 upwards using actuator 304. An air bearing is formed at the interface of test disc 340 and head/slider 322. Eventually, this pressure creates a force on head/slider 322 that overcomes the gimbal force of HGA 320 to create an air bearing. The housing continues to pivot past the point that the force of air bearing 342 overcomes the gimbal force of HGA 320 such that finger 312 no longer touches HGA 320. Once finger 312 no longer touches HGA 320, HGA 320 is considered to be loaded on test disc 340. Once loaded on test disc 340, HGA 320 is supported only by HGA platform 306 and air bearing. In this manner, vibrations, tolerances and other dimensional variations in the moveable components of HGA loader 300, including actuator 304, linkage 314, housing 310, snap-lock interface 315, snap-lock interface 317 and finger 312, do not affect the position of HGA 320 once it is loaded on test disc 340.

HGA loader 300 allows HGA 320 to be loaded on test disc 340 at any location. Furthermore, the position of HGA 320 relative to test disc 340 may be changed during testing. For example, by moving base 302 along line 376, HGA 320 may be moved to any radius of test disc 340 along line 377. Mechanisms that may be used to precisely position HGA 320 include, but are not limited to, rotary actuators, linear servo, or stepper motors configured to move base 302.

Various embodiments of the invention have been described. However, various modifications can be made to the described embodiments. For example, embodiments were described with respect to precisely positioning HGAs for testing with a test disc. However, HGAs may be positioned using the same techniques to read from or write data to a data storage disc. Additionally, in described embodiments an HGA loader was positioned adjacent to a disc rotating about a stationary axis. In other embodiments, the disc may be positioned adjacent to a stationary HGA loader holding an HGA. These and other embodiments are within the scope of the following claims.

The invention claimed is:

1. A device comprising:
  a base including a mounting surface configured to releasably mount a baseplate of a head gimbal assembly, wherein the mounting surface comprises an arrangement of alignment pins to engage an aperture in the head gimbal assembly baseplate;
  a pivotable housing;
  a retractable finger moveable into and out of an aperture in the housing, wherein the retractable finger is configured to releasably engage the head gimbal assembly mounted on the mounting surface and, when retracted into the housing, to deflect the head gimbal assembly toward the aperture in the housing; and
  an actuatable linkage connected to the housing and to the base, wherein the linkage actuates to pivot the housing relative to the base to further mechanically deflect the head gimbal assembly be and the mechanical deflection provided by the retractable finger alone.

2. The device of claim 1, further comprising an actuator connected to the linkage, wherein the actuator pivots the housing by moving the linkage relative to the base.

3. The device of claim 1, further comprising a snap-lock interface between the housing and the base.

4. The device of claim 1, further comprising a piston in the aperture in the housing, wherein the piston extends and retracts the finger.

5. The device of claim 4, wherein the piston is operated pneumatically.

6. The assembly of claim 4, further comprising a spring that biases the piston to a position in which the finger is retracted.

7. The device of claim 1, wherein the mounting surface comprises at least one of a boss hole pin and an alignment pin.

8. An assembly comprising:
  a head gimbal assembly loader; and
  a head gimbal assembly mounted on the gimbal assembly loader, wherein the loader comprises:
    a base including a mounting surface releasably mounting a baseplate of the head gimbal assembly wherein the mounting surface comprises an arrangement of mounting pins engaging an aperture in the head gimbal assembly baseplate;
    a pivotable housing;
    a retractable finger moveable to extend and retract relative the housing, wherein the retractable finger releasably engages the head gimbal assembly mounted on the mounting surface and, when retracted toward the housing, mechanically deflects the head gimbal assembly toward the housing; and
    an actuatable linkage connected to the housing and to the base, wherein the linkage pivots the housing relative to the base when the head gimbal assembly is engaged by the retractable finger to further mechanically deflect the head gimbal assembly beyond the mechanical deflection provided by the retractable finger alone.

9. The assembly of claim 8, further comprising:
  a rotating media disc; and
  a mechanism that moves the head gimbal assembly loader laterally with respect to the rotating disc to locate the head gimbal assembly adjacent to an underside of the disc.

10. The assembly of claim 9, wherein the first height of the mounting surface on the loader is fixed with respect to a plane of a major surface of the disc.

11. The assembly of claim 9, wherein the mechanism comprises a servo controlled linear motor.

12. The device of claim 8, further comprising an actuator connected to the linkage, wherein the actuator pivots the housing by moving the linkage relative to the base.

13. The device of claim 8, further comprising a snap-lock interface between the housing and the base.

14. The device of claim 8, further comprising a piston in an aperture in the housing, wherein the piston extends and retracts the finger.

15. The device of claim 14, further comprising a pneumatic mechanism operating the piston.

16. The assembly of claim 14, further comprising a spring that biases the piston to a position in which the finger is retracted.

17. The device of claim 8, wherein the mounting surface comprises at least one of a boss hole pin and an alignment pin.

18. A device comprising:
  a base including a fixed mounting surface configured to releasably mount a baseplate of a head gimbal assembly, wherein the mounting surface comprises an arrangement of alignment pins to engage an aperture in the head gimbal assembly baseplate;
  a pivotable housing; and
  a retractable finger moveable to extend and retract relative the housing, wherein the retractable finger is configured to releasably engage the head gimbal assembly when the head gimbal assembly is mounted on the mounting surface and, when retracted toward the housing, to deflect the head gimbal assembly toward housing,
  wherein the housing is configured to pivot relative to the base when the head gimbal assembly is engaged by the retractable finger to further mechanically deflect the head gimbal assembly beyond the mechanical deflection provided by the retractable finger alone.

19. The device of claim 18, further comprising a piston in the housing, wherein the piston extends and retracts the finger.

20. The device of claim 18, further comprising an actuator configured to pivots the housing relative to the base.

* * * * *